United States Patent [19]
Piaget et al.

[11] Patent Number: 5,441,466
[45] Date of Patent: Aug. 15, 1995

[54] EXERCISE STEP WITH ADJUSTABLE LEG BELLOWS

[76] Inventors: Gary Piaget, 1435 W. Silvermeadows Dr. #48; Trace O. Gordon, 3880 W. Lariat Rd., both of Park City, Utah 84060

[21] Appl. No.: 191,854

[22] Filed: Feb. 3, 1994

[51] Int. Cl.⁶ ............................................. A63B 22/04
[52] U.S. Cl. ........................................ 482/52; 482/53; 297/423.46; 297/DIG. 8
[58] Field of Search ............ 482/26, 77, 80, 79, 482/110, 111, 27, 148, 30, 33, 112; 297/DIG. 8, 423.46; 5/615

[56] References Cited

U.S. PATENT DOCUMENTS

| | | | |
|---|---|---|---|
| 822,448 | 6/1906 | Hanson | 482/77 |
| 2,469,918 | 5/1949 | Douglas . | |
| 2,680,967 | 6/1954 | Newman | 482/142 |
| 3,295,847 | 1/1967 | Matt, Sr. | 482/80 |
| 3,627,314 | 12/1971 | Brown | 482/77 |
| 4,120,061 | 10/1978 | Clark | 297/DIG. 8 |
| 4,279,415 | 7/1981 | Katz | 482/53 |
| 4,516,767 | 5/1985 | Eskijian | 482/27 |
| 4,635,931 | 1/1982 | Brannstam | 482/112 |
| 4,993,736 | 2/1991 | Garman et al. | 297/DIG. 8 |
| 5,002,294 | 3/1991 | Franz | 482/77 |
| 5,112,045 | 5/1992 | Mason et al. | 482/77 |
| 5,127,647 | 7/1992 | Wilkinson . | |
| 5,158,512 | 10/1992 | Irwin et al. . | |
| 5,170,522 | 12/1992 | Walker | 5/615 |
| 5,184,987 | 2/1993 | Wilkinson . | |
| 5,186,700 | 2/1993 | Wang | 482/111 |
| 5,210,889 | 5/1993 | Wesemann et al. | 5/615 |
| 5,267,923 | 12/1993 | Piaget et al. | 482/53 |

FOREIGN PATENT DOCUMENTS 1348531  3/1974  United Kingdom ............ 482/26

*Primary Examiner*—Stephen R. Crow
*Assistant Examiner*—Jerome Donnelly
*Attorney, Agent, or Firm*—Salter & Michaelson

[57] ABSTRACT

An exercise step includes a generally rectangular stepping platform having first and second ends and further includes first and second pairs of leg bellows respectively mounted to the first and second ends of the platform thereby forming four legs for supporting the stepping platform above a supporting surface. Each pair of leg bellows is controlled by a single valve for selectively simultaneously inflating or deflating the pair of leg bellows to selectively adjust the height of the platform above a supporting surface. A channel extends between the paired leg bellows at each end of the platform. Each leg bellows includes a flexible air tube extending therefrom, and the air tubes are received in the channels in the bottom of the platform. The valves comprise slotted valve stems which extend into the channels. The paired set of air tubes is received through the slot in the valve stem and the valve stems are slidably movable to open and close paired sets of air tubes in the respective channel to simultaneously control inflation and deflation of each pair of leg bellows.

7 Claims, 4 Drawing Sheets

EXERCISE STEP WITH ADJUSTABLE LEG BELLOWS

BACKGROUND AND SUMMARY OF THE INVENTION

The instant invention relates to exercise step structures and more particularly to an exercise step having adjustable support legs.

Exercise, or aerobic, steps having adjustable leg members have heretofore been known in the art. In this regard, the Wilkinson U.S. Pat. No. 5,127,647; Wilkinson U.S. Pat. No. 5,184,987; and Irwin et al U.S. Pat. No. 5,158,512 represent the closest prior art to the subject invention of which the applicant is aware. The Wilkinson U.S. Pat. No. 5,127,647 discloses an adjustable exercise step having a rectangular stepping platform and four telescoping legs mounted at the corners of the platform. The legs adjustably telescope outwardly for height adjustment. The Wilkinson U.S. Pat. No. 5,184,987 and Irwin et al U.S. Pat. No. 5,158,512 disclose aerobic stepping structures including a platform and a plurality of stackable support elements. One or more of the stackable elements are utilized to adjust the height of the platform.

Air filled bladder elements for raising and lowering structures have also been known in the art. In this connection, the Douglas U.S. Pat. No. 2,469,918 and Mason et al U.S. Pat. No. 5,112,045 are also relevant to the instant invention. The patent to Douglas discloses an aviation trainer in which a plurality of bellows are used to smoothly adjust pitch and roll of the trainer. The patent to Mason et al discloses an exercise and rehabilitation device comprising a platform and a bladder for supporting the platform. The bladder makes the platform unstable when a user stands thereon. The object of the exercise is for the user to maintain balance while standing on the platform.

The instant invention provides an exercise step comprising a generally rectangular stepping platform having first and second ends, and further comprising first and second pairs of leg bellows respectively mounted to the first and second ends of the platform thereby forming four legs for supporting the stepping platform above a supporting surface. Each pair of leg bellows is controlled by a single valve for selectively simultaneously inflating or deflating the pair of leg bellows to selectively adjust the height and/or angle of the platform above a supporting surface. A channel extends between the paired leg bellows at each end of the platform, and the valves comprise slotted valve stems which extend into the channels. Each leg bellows includes a flexible air tube extending therefrom and the air tubes are received in the channels in the bottom of the platform. The paired air tubes in the channels are further received through the slots in the respective valve stems, wherein the valve stems are slidably movable to pinch and unpinch, i.e. close and open, the paired sets of air tubes to simultaneously control inflation and deflation of each pair of leg bellows. The adjustable leg bellows also enable the platform to be set in an inclined position. The air filled leg bellows provide an air suspension system which is operable for absorbing impact when a user steps on the stepping platform thereby reducing inertial loads on the users leg joints during use.

Accordingly, it is an object of the instant invention to provide an exercise step with adjustable leg members.

It is another object to provide an exercise step having four adjustable leg bellows for adjusting the height and angle of the step platform.

It is yet another object to provide an exercise step having leg bellows wherein pairs of leg bellows at opposite ends of the stepping platform are operated by a single valve mechanism.

It is still a further object to provide an exercise step having an air suspension support system which absorbs impact and reduces inertial loads on the user's leg joints during use.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
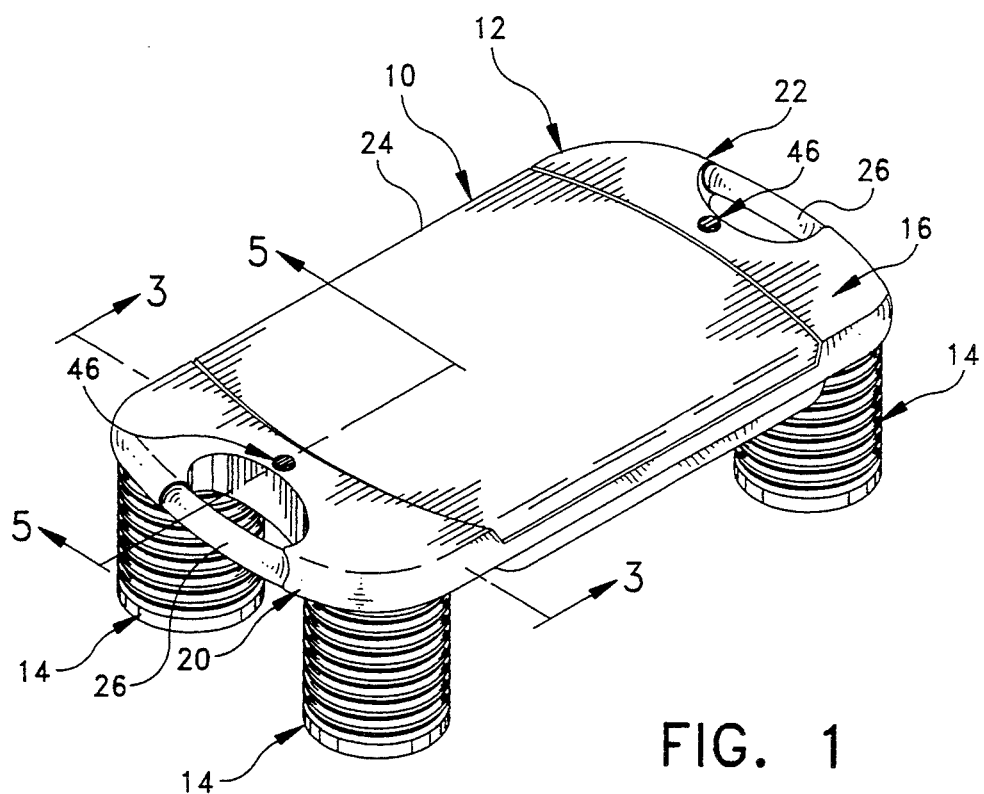
FIG. 1 is a top perspective view of the aerobic step of the instant invention.
Figure 2:
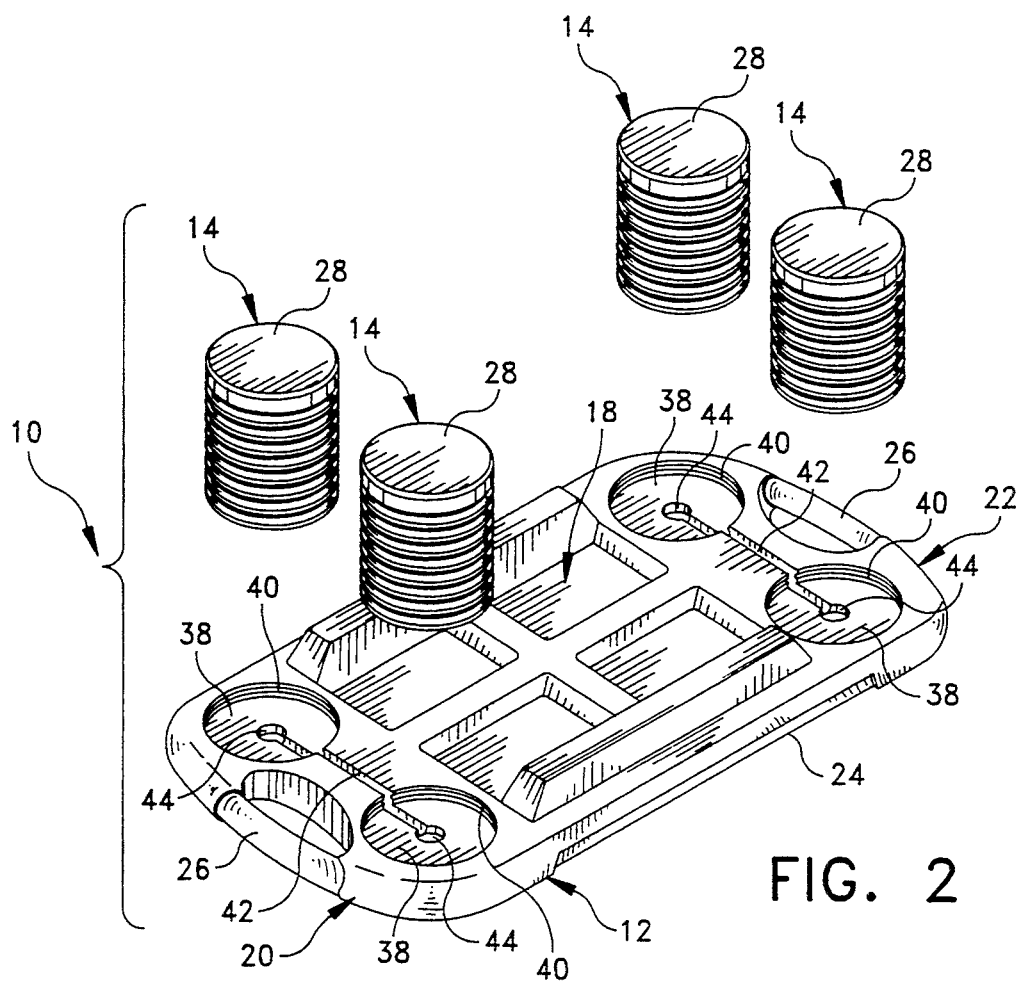
FIG. 2 is a bottom exploded perspective view thereof.

Referring now to the drawings, the exercise step of the instant invention is illustrated and generally indicated at 10 in FIGS. 1-7. As will hereinafter be more fully described, the instant exercise step 10 is supported on air filled leg bellows which provide an air suspension system for relieving stress on the user's legs joints as well as infinite height adjustment.

The instant exercise step 10 comprises a generally rectangular stepping platform generally indicated at 12, and four leg bellows generally indicated at 14 for supporting the stepping platform 12 above a supporting surface.

The stepping platform 12 is preferably constructed as a singular blow molded unit, and it includes upper and lower surfaces generally indicated at 16 and 18 respectively, and first and second ends generally indicated at 20 and 22 respectively. The upper surface 16 of the stepping platform 12 includes a central stepping area 24 upon which a user steps during use. The stepping area 24 preferably comprises a non-slip material to prevent slipping during use. The first and second ends 20 and 22 of the stepping platform 12 include integral handle members 26 to facilitate lifting and transportation of the exercise step 10.

The four leg bellows 14 are cylindrical in shape and each comprises a pleated expandable body having a bottom end 28 adapted to be received on a flat supporting surface, and a top end 30. The top end 30 includes a circumferential ridge 32 and an upwardly extending barb shaped air fitting 34 for inflating and deflating the leg bellows 14. Each leg bellows 14 further includes a flexible air tube 36 which is slidably received over the air fitting 34. The leg bellows 14 are mounted to the bottom surface 18 of the stepping platform 12 so as to support the stepping platform 12 above a supporting surface. In this regard, a spaced pair of leg bellows 14 are mounted adjacent each of the first and second ends 20 and 22 of the stepping platform 12 so as to form four spaced supporting legs for the stepping platform 12. More specifically, the leg bellows 14 are snap received into recesses 38 formed in the bottom surface 18 of the stepping platform 12. The recesses 38 each include an annular groove 40 extending therearound for snap engagement with the circular ridge 32 of the leg bellows 14.

The bottom surface 18 of the stepping platform 12 further includes a transverse channel 42 extending between each spaced paired of recesses 38, and a circular depression 44 in the center of each recess 38. When each leg bellows 14 is snap received into its respective recesses 38, the barb fitting 34 is received into the circular depression 44 in the top of the recess 38 and the air tube 36 is received into the adjacent channel 42. Referring to FIG. 3-7 the air tubes 36 from each spaced pair of leg bellows 14 are received in adjacent relation in their respective channel 42.

Figure 3:
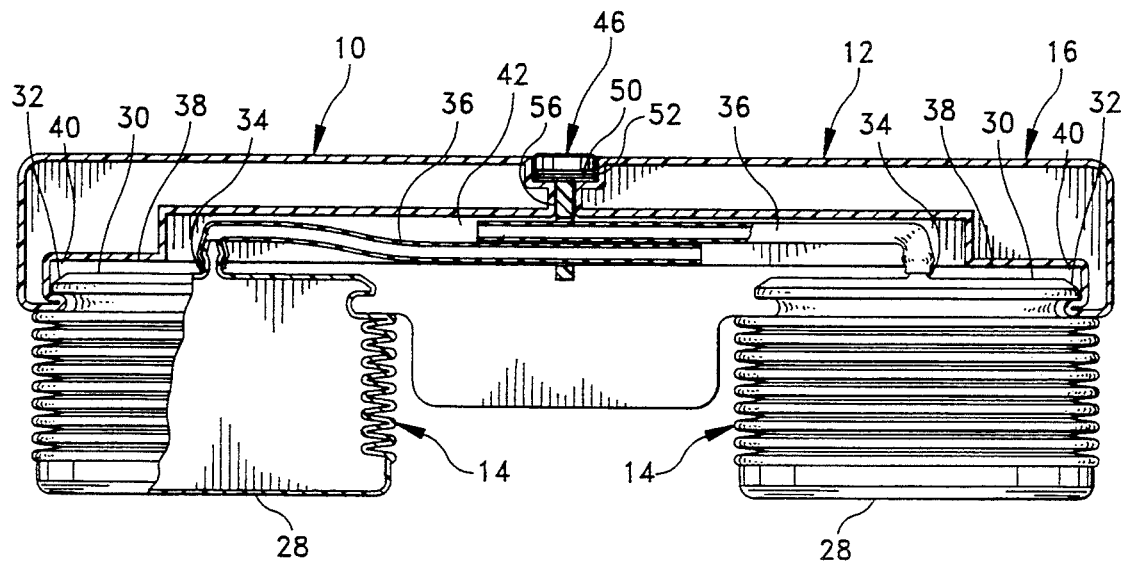
FIG. 3 is a cross-sectional view thereof taken along line 3—3 of FIG. 1.
Figure 4:
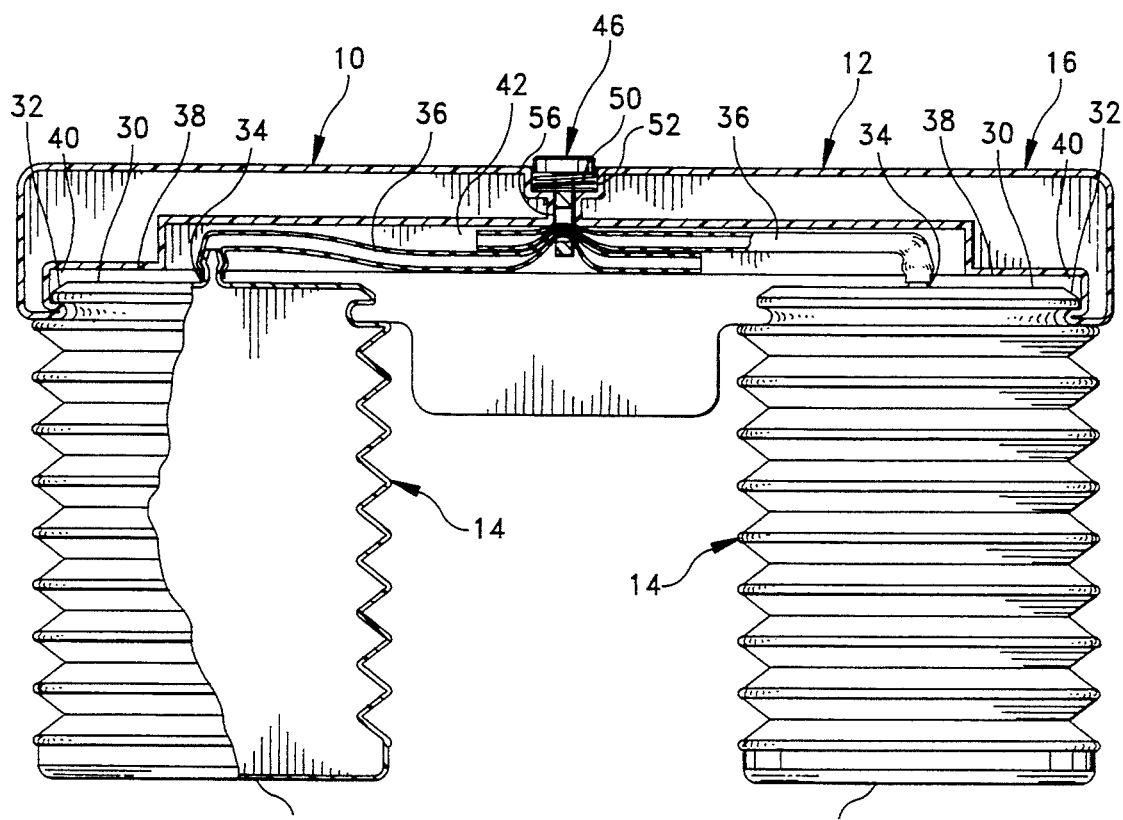
FIG. 4 is a similar cross-sectional view with the valve stem depressed to open the air tubes.
Figure 5:
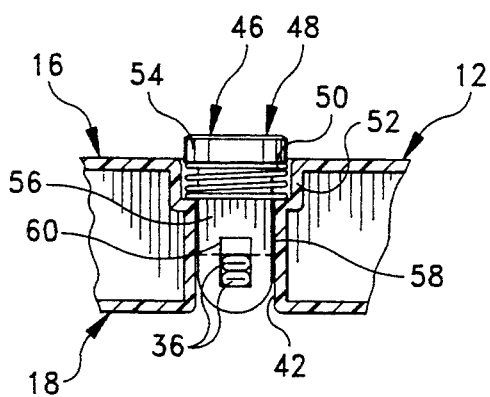
FIG. 5 is a cross-sectional view thereof taken along line 5—5 of FIG. 1.
Figure 6:
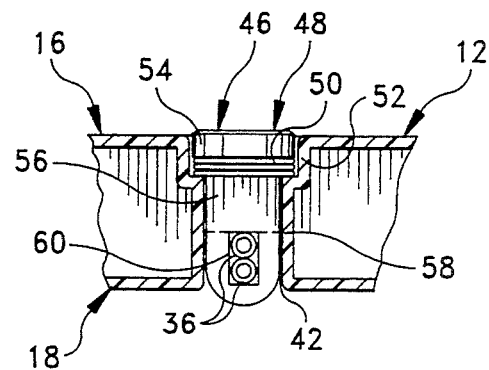
FIG. 6 is a similar cross-sectional view with the valve stem depressed to open the air tubes.
Figure 7:
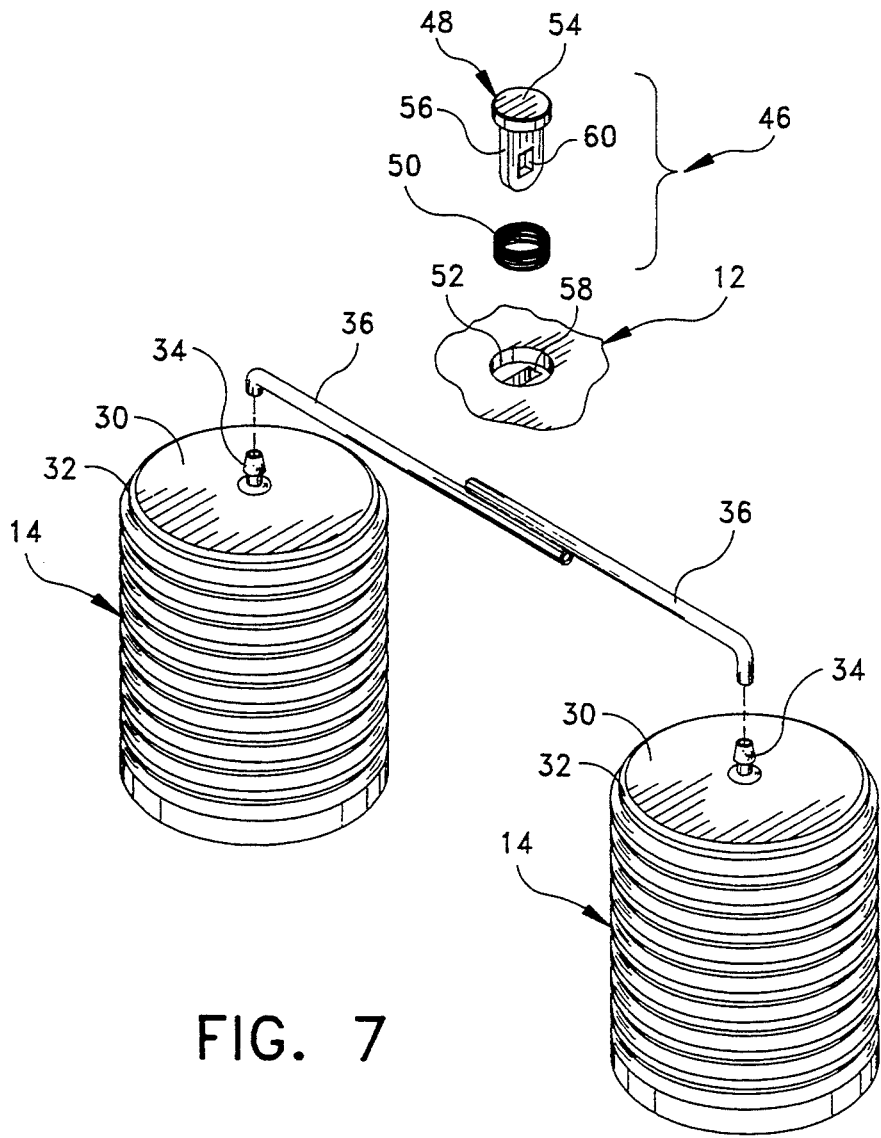
FIG. 7 is a perspective view of one pair of leg bellows shown in connection with the valve stem assembly.

Each pair of leg bellows 14 is controlled by a independent valve assembly generally indicated at 46 for selectively simultaneously inflating or deflating the pair of leg bellows 14 to selectively adjust the height of the stepping platform 12 above a supporting surface. The valve assemblies 46 each comprises a slotted valve stem generally indicated at 48 (FIG. 7) and a spring 50 (FIG. 7) which are mounted in a circular recess 52 in the top surface 16 of the stepping platform 12. The valve stem 48 comprises a head portion 54 and a body portion 56 which extends downwardly into the adjacent channel 42 through a rectangular guide slot 56 extending downwardly from the recess 52. The body portion 56 of the valve 48 stem includes a slot 60 therein. In this connection, the paired air tubes 36 in the channels 42 are received through the slot 60 in the respective valve stems 48 (See FIGS. 3-6). The valve stem 48 is slidably movable in the guide slot 58 to pinch and unpinch, i.e. close and open, the air tubes 36. More specifically, the valve stem 48 is slidably movable between a first upward position (FIGS. 3 and 5) wherein the air tubes 36 are pinched closed between the lower end of the valve stem slot 60 and the upper wall of the channel 42, and a second downward position (FIGS. 4 and 6) wherein the air tubes 36 rest in an unpinched open state while extending through the valve stem slot 60. Since the air tubes 36 are paired together in the channel 42, the single valve stem 48 is operative for simultaneously controlling inflation and deflation of the spaced pair of leg bellows 14. The spring 50 is captured between the head portion 54 of the valve stem 48 and the recess 52 (FIGS. 5 and 6), and it is operative for normally urging the valve stem 48 upwardly to normally pinch the air tubes closed (FIG. 3).

In use, the air filled leg bellows 14 adjustably expand to provide for infinite height adjustment of the stepping platform 12 above a supporting surface. To inflate or deflate each pair of leg bellows 14 at the respective ends 20 and 22 of the stepping platform 12, i.e. to adjust the height of the stepping platform 12, the user depresses the respective valve assembly 46 to unpinch the air tubes 36, expands or contracts the leg bellows 14 to the height desired, and then releases the valve assembly 46. The most common use of the exercise step 10 is to have each of the four leg bellows 14 positioned at the same height so as to provide a horizontal stepping surface, however it is also possible to have one end of the step 10 either higher or lower than the other end to provide a end-to-end inclined stepping surface. Inclination of the step 10 is accomplished by setting one pair of leg bellows 14 at a different height then the other pair. While it is readily understood that each valve assembly 46 simultaneously controls inflation of each pair of leg bellows 14, it is also to be understood that the individual leg bellows 14 of each pair are nevertheless individually expandable. In this connection, the one leg bellows 14 of a pair is positioned higher or lower than the other leg bellows 14, to give the exercise step 10 the ability to be positioned in a front-to-back inclined position.

The leg bellows 14 further provide an air cushioned suspension system for the stepping platform 12. The air suspension leg bellows 14 absorb the downward impact of a user's weight as the user steps thereon and thereby reduce inertial loads on the users leg joints during use. The air suspension bellows 14 therefore make aerobic stepping exercises more comfortable and safer to perform.

Figure 8:
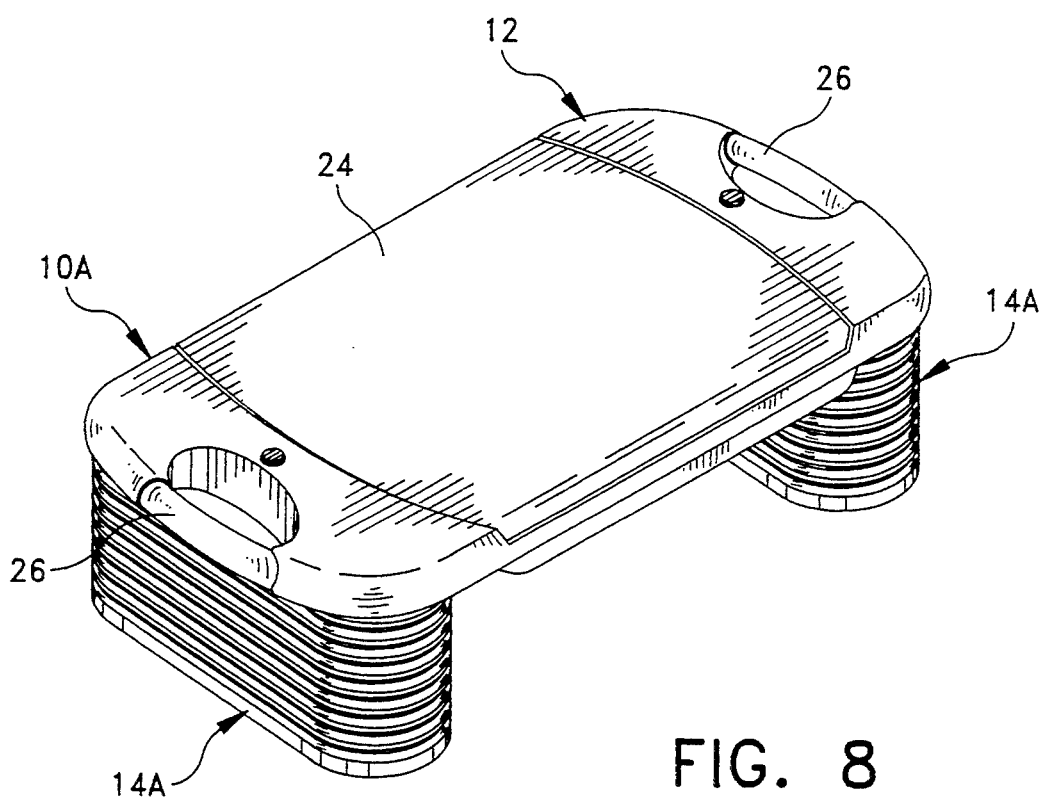
FIG. 8 is a perspective view of a second embodiment thereof.
Figure 9:
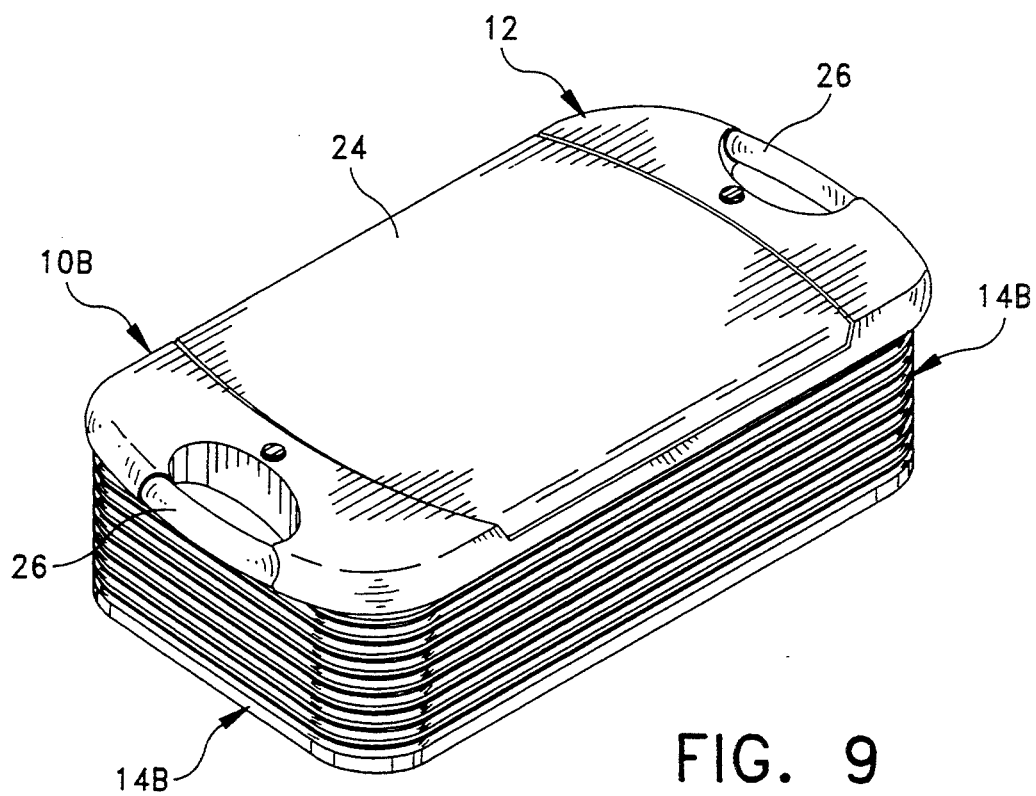
FIG. 9 is another perspective view of a third embodiment.

Referring to FIGS. 8 and 9, second and third alternative embodiments of the instant exercise step are illustrated and respectively indicated at 10A and 10B. The second embodiment 10A comprises a stepping platform 12 as previously described, however there are two generally rectangular shaped leg bellows 14A mounted to the bottom of the platform 12 instead of four cylindrical leg bellows 14 as previously described. The two rectangular leg bellows 14A are individually controlled for inflation and deflation. The third embodiment 10B also includes a stepping platform 12 as previously described, however the stepping platform 12 is supported by a single rectangular bellows 14B which covers substantially entirely the bottom surface of the platform 12. While these alternative embodiments 10A and 10B have virtually the same operational characteristics as the preferred device 10, the larger rectangular bellows 14 A and 14B are more difficult and more expensive to manufacture than the smaller cylindrical leg bellows 14, thereby making the second and third embodiments 10A and 10B more expensive to market.

It can therefore be seen that the instant invention provides a unique exercise step 10. The exercise step 10 is supported on one or more expandable leg bellows 14 which provide for infinite height and angle adjustment. The leg bellows 14 further provide an air suspension system which absorbs impact energy of a user stepping thereon thereby reducing inertial loads on the users leg joints. Inflation and deflation of the leg bellows 14 is controlled by a simple valve mechanism 46 which is depresses to inflate or deflate and released to maintain in a steady state condition. When four leg bellows 14 are mounted in the corners of the platform, the paired leg bellows 14 at each end of the platform 12 are controlled by a single valve assembly 46 to simultaneously and selectively control inflation and deflation of the paired leg bellows 14. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. An exercise step comprising:
    a single, substantially rigid stepping platform having first and second ends;
    first and second pairs of spaced leg bellows respectively mounted at said first and second ends of said platform for supporting said stepping platform above a supporting surface, each of said leg bellows having a flexible air tube extending outwardly therefrom for inflating and deflating said leg bellows, to a predetermined height so as to adjust a height of said stepping platform above said supporting surface, said platform further including a first channel extending between said first pair of spaced leg bellows and a second channel extending between a second pair of spaced leg bellows, said air tubes of said first pair of spaced leg bellows being received in said first channel and said air tubes of said second pair of spaced bellows being received in said second channel;
    a first valve for simultaneously controlling air flow in said air tubes of said first pair of spaced leg bellows; and
    a second valve for simultaneously controlling air flow in said air tubes of said second pair of spaced leg bellows, said first and second valves each comprising:
    a valve stem having a slotted opening in one end thereof, said slotted end of said valve stem extending into a respective channel wherein said air tubes extend through said slotted opening, said valve stem being slidably movable in said channel between a first position wherein said air tubes are pinched against a wall of said channel and a second position wherein said air tubes are open to allow air flow; and
    means for normally biasing said valve stem to said first position.

2. An exercise step comprising:
    a single substantially rigid stepping platform having upper and lower surfaces;
    at least three bellows mounted in spaced relation on the lower surface of said stepping platform for substantially rigidly supporting said stepping platform above a supporting surface, each of said bellows including a respective air path for individually inflating and deflating said respective bellows to a predetermined height so as to adjust a height of said stepping platform above said supporting surface; and
    a valve device for selectively opening and closing each of said air paths, each of said bellows being individually adjustable to a predetermined height when said respective air path is open, each of said bellows being operative for substantially maintaining said predetermined height when said respective air path is closed.

3. In the exercise step of claim 2, said air path comprising a flexible tube extending outwardly from said bellows, said valve device comprising a spring loaded pinching member for selectively pinching said tube from a normally open position to a closed position.

4. An exercise step comprising:
    a single, generally rectangular rigid stepping platform having upper and lower surfaces, and four corner portions;
    four bellows respectively mounted on the lower surfaces of the four corner portions of said stepping platform, said bellows substantially rigidly supporting said stepping platform above a supporting surface, each of said bellows including a respective air path for individually inflating and deflating said respective bellows to a predetermined height so as to adjust a height of said stepping platform above said supporting surface; and
    a valve device for selectively opening and closing each of said air paths, said bellows being individually adjustable to said predetermined height when said respective air path is open, said bellows being operative for substantially maintaining said predetermined height when said respective air path is closed.

5. In the exercise step of claim 4, said air path comprising a flexible tube extending outwardly from said bellows, said valve device comprising a spring loaded pinching member for selectively pinching said flexible tube from a normally open position to a closed position.

6. An exercise step comprising:
    a single rigid stepping platform having upper and lower surfaces and first and second ends;
    first and second pairs of spaced bellows respectively mounted on the lower surface of said stepping platform adjacent to said first and second ends thereof, said bellows substantially rigidly supporting said stepping platform above a supporting surface, each of said leg bellows having a respective flexible air tube extending outwardly therefrom for individually inflating and deflating said bellows to a predetermined height so as to adjust a height of said stepping platform above said stepping surface, said air tubes of said first pair of bellows being received in adjacent relation, said air tubes of said second pair of bellows being received in adjacent relation;
    a first spring loaded pinching device for selectively simultaneously pinching said air tubes of said first pair of spaced bellows from a normally open position to a closed position; and
    a second spring loaded pinching device for selectively simultaneously pinching said air tubes of said second pair of spaced bellows from a normally open position to a closed position,
    each of said bellows being individually adjustable to a predetermined height when said respective air tube is open, each of said bellows being operative for substantially maintaining said predetermined height when said respective air tube is closed.

7. In the exercise step of claim 6, said stepping platform further including a first channel extending between said first pair of bellows and a second channel extending between said second pair of bellows, said air tubes of said first pair of bellows being received in said first channel and said air tubes of said second pair of bellows being received in said second channel, said first and second pinching devices each comprising:
    a valve stem having a slotted opening in one end thereof, said slotted end of said valve stem extending into a respective channel wherein said air tubes extend through said slotted opening, said valve stem being slidably movable in said channel between a first position wherein said air tubes are pinched against a wall of said channel and a second position wherein said air tubes are open to allow air flow; and a spring element for normally biasing said valve stem to said first position.

* * * * *